United States Patent
Vaidyanathan et al.

(10) Patent No.: US 7,937,688 B2
(45) Date of Patent: May 3, 2011

(54) SYSTEM AND METHOD FOR CONTEXT-SENSITIVE HELP IN A DESIGN ENVIRONMENT

(75) Inventors: Shankar Vaidyanathan, Sammamish, WA (US); Randy S. Kimmerly, Woodinville, WA (US); Biliana K. Kaneva, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

(21) Appl. No.: 11/672,558

(22) Filed: Feb. 8, 2007

(65) Prior Publication Data

US 2007/0168909 A1 Jul. 19, 2007

Related U.S. Application Data

(63) Continuation of application No. 10/218,222, filed on Aug. 12, 2002, now abandoned.

(51) Int. Cl.
G06F 9/44 (2006.01)

(52) U.S. Cl. .................. 717/111; 717/106; 717/112

(58) Field of Classification Search .................. None
See application file for complete search history.

(56) References Cited

U.S. PATENT DOCUMENTS

| | | | | |
|---|---|---|---|---|
| 4,674,065 A | | 6/1987 | Lange et al. .................. 364/900 |
| 4,796,179 A | * | 1/1989 | Lehman et al. .................. 700/86 |
| 5,267,155 A | | 11/1993 | Buchanan et al. ....... 364/419.14 |
| 5,392,386 A | | 2/1995 | Chalas .......................... 395/155 |
| 5,452,449 A | | 9/1995 | Baldwin, Jr. et al. ......... 355/600 |
| 5,499,371 A | * | 3/1996 | Henninger et al. ........... 717/108 |
| 5,522,079 A | * | 5/1996 | Acker et al. ................... 717/170 |
| 5,699,310 A | * | 12/1997 | Garloff et al. ................. 717/108 |
| 5,813,019 A | * | 9/1998 | Van De Vanter .............. 715/236 |
| 5,815,830 A | | 9/1998 | Anthony ....................... 707/758 |
| 5,859,636 A | | 1/1999 | Pandit .......................... 345/335 |
| 5,946,647 A | | 8/1999 | Miller et al. ...................... 704/9 |
| 6,066,181 A | * | 5/2000 | DeMaster ..................... 717/148 |
| 6,085,201 A | | 7/2000 | Tso ............................... 707/505 |
| 6,122,647 A | | 9/2000 | Horowitz et al. ............. 707/513 |
| 6,163,879 A | | 12/2000 | Mackey ............................ 717/1 |
| 6,182,274 B1 | * | 1/2001 | Lau ............................... 717/104 |
| 6,269,475 B1 | | 7/2001 | Farrell et al. ...................... 717/2 |
| 6,289,513 B1 | * | 9/2001 | Bentwich ...................... 717/106 |
| 6,305,008 B1 | | 10/2001 | Vaidyanathan et al. .......... 717/4 |
| 6,311,323 B1 | | 10/2001 | Shulman et al. .................. 717/1 |
| 6,314,559 B1 | | 11/2001 | Sollich ............................. 717/5 |
| 6,367,068 B1 | | 4/2002 | Vaidyanathan et al. .......... 717/8 |
| 6,502,233 B1 | | 12/2002 | Vaidyanathan et al. ...... 717/101 |
| 6,571,232 B1 | * | 5/2003 | Goldberg et al. .................. 1/1 |
| 6,697,825 B1 | | 2/2004 | Underwood et al. ......... 707/530 |
| 6,788,317 B2 | * | 9/2004 | Gardas et al. ................. 715/762 |
| 7,003,522 B1 | | 2/2006 | Reynar et al. |
| 7,065,745 B2 | * | 6/2006 | Chan ............................. 717/117 |

(Continued)

OTHER PUBLICATIONS

Henninger, S., et al., "A tool for managing software development knowledge," PROFES, Bomarius, F., et al. (Eds.), 2001, LNCS 2188, 182-195.

(Continued)

Primary Examiner — Jason Mitchell
(74) Attorney, Agent, or Firm — Woodcock Washburn LLP

(57) ABSTRACT

An intelligent tool for assisting a developer during the creation or maintenance of software generates an icon when triggered by input. Upon selection of the icon, options are displayed for potential selection. Upon selection of an entry, event associated with the entry are deployed.

3 Claims, 5 Drawing Sheets

U.S. PATENT DOCUMENTS

| | | | |
|---|---|---|---|
| 7,325,194 | B2 | 1/2008 | Arayasantiparb et al. |
| 7,346,892 | B2 * | 3/2008 | Shou et al. .................... 717/112 |
| 7,707,024 | B2 | 4/2010 | Arayasantiparb et al. |
| 7,707,496 | B1 | 4/2010 | Abbar et al. |
| 7,742,048 | B1 | 6/2010 | Abbar et al. |
| 2002/0062475 | A1 * | 5/2002 | Iborra et al. .................... 717/108 |
| 2002/0083415 | A1 * | 6/2002 | Jazdzewski .................... 717/111 |
| 2002/0104072 | A1 * | 8/2002 | Ecker et al. .................... 717/110 |
| 2003/0093769 | A1 * | 5/2003 | Kumar .......................... 717/108 |
| 2003/0221184 | A1 * | 11/2003 | Gunjal et al. .................. 717/118 |
| 2003/0233632 | A1 * | 12/2003 | Aigen et al. .................... 717/106 |
| 2006/0090154 | A1 * | 4/2006 | Bustelo et al. ................. 717/110 |
| 2006/0206866 | A1 * | 9/2006 | Eldrige et al. ................. 717/122 |

OTHER PUBLICATIONS

Kucza, T., et al., "Improving knowledge management in software reuse process," *PROFES*, Bomarius, F., et al., (Eds.), 2001, *LNCS* 2188, 141-152.

Breidenbach, G., "Programmable Keyboard Controller", *Electronic Praxis*, 2001, 6, 68-70 (English Language Abstract).

Holmes, N., "Seven Great Blunders of the Computing World", *Computer*, 2002, 110-112.

Zagler, W.L., "Text Generation for Disabled Persons Using Word Prediction", *OEGAI-Journal*, 2001, 20(2), 21-22 (English Language Abstract).

IBM Research/Eclipse, http://www.research.ibm.com/eclipse,Home page ,2 pages, Sep. 29, 2003.

JetBrains IntelliJ IDEA—the best Java IDE around, http://www.intellij.com, 1 page, Sep. 23, 2009.

Slickedit;Code Editor, C++ Editor, Java Editor, HTML Editor, XML Editor, Unicode Editor, http://www.slickedit.com, 1 page, Sep. 29, 2003.

Source Insight Program Editor and Analyzer, http://www.sourcedyn.com/index.html, 2 pages, Sep. 29, 2003.

Borland, CodeWright—The Programmer's Editing System, http://www.premia.com, 1 page, Sep. 29, 2003.

Chalmers-Physical Resource Theory, "The Complex Adaptive Systems Programme of year 2000", http://www.frt.fy.chalmers.se/kristian/software.html, 1 page, Sep. 29, 2003.

Emacs/W3 v 4.0, http://www.cs.indiana.edu/elisp/w3/docs.html, 1 page, Sep. 29, 2003.

Vi: A Unix text editor, http://www.indiana.edu/~ucspubs/b104/ztoc.html, 8 pages, Sep. 29, 2003.

Anderson, K.M. et al., "Chimera: Hypertext for Heterogeneous Software Environments", *Association for Computing Machinery*, 1994, *ECHT '94 Proceedings*, Department of Information and Computer Science, University of California, Irvine California, USA, 94-107.

Hughes, G. et al., "Microsoft Smart Tags: Support Ignore or Condemn Them?", *Association of Computing Machinery*, Jun. 11-15, 2002, 80-81.

Lewis, P.H. et al., "Media-based Navigation with Generic Links", *Association of Computing Machinery*, 1996, The Multimedia Research group, Department of Electronics and Computer Science, University of Southampton, England, 215-223.

Middel, C.D., "Software Configuration and Change Management", *Proceedings 5th Conference on Quality Engineering in Software Technology*, 2001, 239-245 (English Language Abstract).

Jewell, D. "Windows Shell Secrets", *EXE*, 1999, 13(9), 35-45.

Kramer, B. "3D LISP Tools", *Cadence*, 1989, 4(5), 130-134.

Lin, C.F. et al., "Chinese Text Distinction and Font Identification by Recognizing most Frequently Used Characters", *Image and Vision Computing*, 2001, 19, 329-338.

Willisson, Pace, et al., ISPELL: UNIX Man Pages, Aug. 23, 2003, 73 pages.

SED(1), BSD Reference Manual, sedMan.txt, 6 pages, Dec. 30, 1993.

McMahon, L.E., "SED—A Non-Interactive Text Editor", *Bell Laboratories*, Aug. 15, 1978, 10 pages.

The Complete Red Hat® Linux™ Operating System 5.2 Deluxe, Macmillan Digital Publishing, U.S.A., 385 pages, 1998.

CoStar User's Manual, "For AddressMate and AddressMate Plus", CoStar Corp., 1994-1995, pp. 1-1 thru Index-210.

Beitner, N.D. et al., "Multimedia Support and Authoring in Microcosm: An Extended Model", Department of Electronics and Computer Science, University of Southampton, 12 pages, 1994.

IBM Research Disclosure #368, "Multimedia Hyperlinks Automatically Created for Reference Documents", Jun. 1993, 5 pages.

Microsoft® Office 97 User's Manual, "Getting Results with Microsoft® Office 97—Real World Solutions for the Work You Do", 1997, 1-703.

Corel® Corporation Limited, Corel® InfoCentral User's Manual, 1996, vol. 1, Version 7.0 , 1996, 1 thru 86.

Corel® Office Professional 7 Quick Results, 1-531, 1993.

Novell® GroupWise™ User's Guide for Windows 16-Bit, Version 5.2, 1993-1997, 1-231.

Novell® Group Wise™ User's Guide for Windows 32-Bit, 1998, Novell, Inc., 1-318.

Claris for Macintosh, Claris Emailer Getting Started, 1995-1997, Claris Corporation, 61 pages.

Developer's Guide to Apple Data Detectors—For Version 1.0.2, © Apple Computer, Inc., 1997, 1-34.

Apple Data Detectors User's Manual, © 1997 Apple Computer, Inc., 1-16.

Nardi, B.A. et al., "Collaborative, Programmable Intelligent Agents", Mar. 1998, Apple Computer advanced Technology Group, 1-11.

Ye, et al., Integrating Active Information Delivery and Reuse Repository Systems, 2000, AMC SIGSOFT, 60-68.

U.S. Appl. No. 09/907,418, filed Jul. 17, 2001, Reynar et al.
U.S. Appl. No. 09/906,467, filed Jul. 16, 2001, Reynar et al.
U.S. Appl. No. 09/906,552, filed Jul. 16, 2001, Reynar et al.
U.S. Appl. No. 10/020,343, filed Dec. 10, 2001, Hough et al.
U.S. Appl. No. 09/995,224, filed Nov. 26, 2001, Klein et al.
U.S. Appl. No. 09/841,265, filed Apr. 24, 2001, Reynar.
U.S. Appl. No. 09/841,266, filed Apr. 24, 2001, Reynar.
U.S. Appl. No. 09/191,757, filed Nov. 13, 1998, Vaidyanathan et al.
U.S. Appl. No. 09/588,411, filed Jun. 6, 2000, Reynar et al.
U.S. Appl. No. 10/179,438, filed Jun. 25, 2002, Reynar, et al.
U.S. Appl. No. 10/179,810, filed Jun. 25, 2002, Helfrich, et al.

* cited by examiner ly, the inven-tion-

SYSTEM AND METHOD FOR CONTEXT-SENSITIVE HELP IN A DESIGN ENVIRONMENT

CROSS-REFERENCE TO RELATED APPLICATIONS

This application is a continuation of patent application Ser. No. 10/218,222, filed Aug. 12, 2002, the entire disclosure of which is hereby incorporated by reference in its entirety.

FIELD OF THE INVENTION

This invention relates to the field of computing and in particular to the field of development tools.

BACKGROUND

Programming languages have become more powerful over time through the addition of features and capabilities. The increased power and capability of languages has been accompanied by an increase in complexity. As software increases in complexity, the development of software is becoming more and more difficult. Source code may exceed hundreds of pages in length and may involve the use of many different source code files and programming libraries. The number and complexity of functions available to a software developer has greatly increased. For example, multiple functions or methods within a class hierarchy may share the same name (or identifier), but have different numbers of parameters or different parameter types. A large number of identifiers may be used, including typedefs, variables, macros, parameters, namespaces, templates, attributes and so on. Each of these identifiers typically requires a type declaration and/or definition specified. Hence programming tools that make development efforts easier and more accurate are widely desired.

One way to make the task of the developer more manageable is to establish an Integrated Development Environment (IDE). These environments typically include browsers and editors enabling developers to edit multiple source files. For object oriented languages, the IDE may also provide a browser that enables a developer to navigate and view the class hierarchy. To further assist the programming effort an IDE may support some kind of on-line statement building mechanism such as the one described in U.S. Pat. No. 6,311,323 B1 issued Oct. 30, 2001, entitled "Computer Programming Language Statement Building and Information Tool". A help information mechanism may enable a developer to refer to on-line documentation describing varying function definitions. In addition, an IDE may provide automatic help modules displaying reference information associated with identifiers and so on, as described in U.S. patent application Ser. No. 09/191,757, filed Nov. 13, 1998, entitled "Automated Help Information for Reference Information", now U.S. Pat. No. 6,502,233. A completion module for auto-completion of programming statements may also be available within the IDE, as described in U.S. Pat. No. 6,305,008 B1, issued Oct. 16, 2001 entitled, "Automatic Statement Completion". Such a tool may be invoked as a developer is writing code, and may display a list of potential completion candidates to the developer. The developer may then pick the desired candidate or continue typing, freeing the developer from having to consult printed or on-line documentation, class hierarchies or other source code files.

To date however, a tool that can intelligently understand what the user (e.g., developer) is doing and help the user accomplish the next set of tasks is not known. It would be helpful if there were a tool that could track the intentions of a user and proffer up a list of options of potential next tasks, based on the user's action.

SUMMARY

A context-sensitive design time tool monitors user input during a program development or program maintenance operation and displays an icon when user input triggers a potential next task or tasks. Upon selection of the icon, the tool proffers a list of possible next tasks. Upon selection of an entry in the list, the task is automatically performed.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Exemplary Computing Environment

Figure 1:
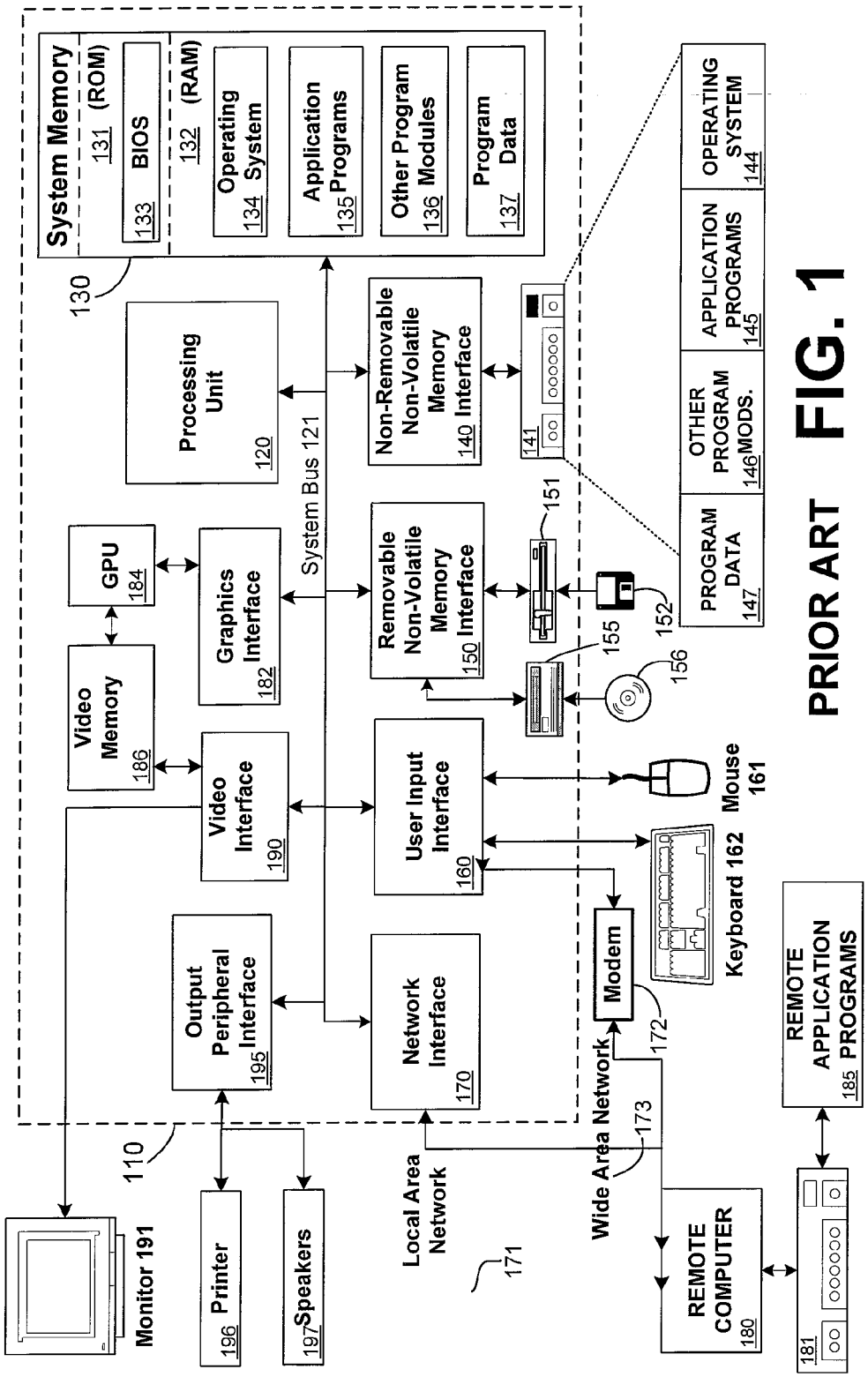
FIG. 1 is a block diagram of an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Context-Sensitive Help in a Development Environment

A context-sensitive design-time tool dynamically monitors user (e.g., developer) input during software development. When the tool intelligently determines a potential next task or tasks, an icon is generated. Upon selection of the icon, a list of potential next task(s) is displayed. Upon selection of an entry, the task is automatically performed. Automatically-performed tasks include, but are not limited to, automatically inserting code into a source program.

Figure 2:
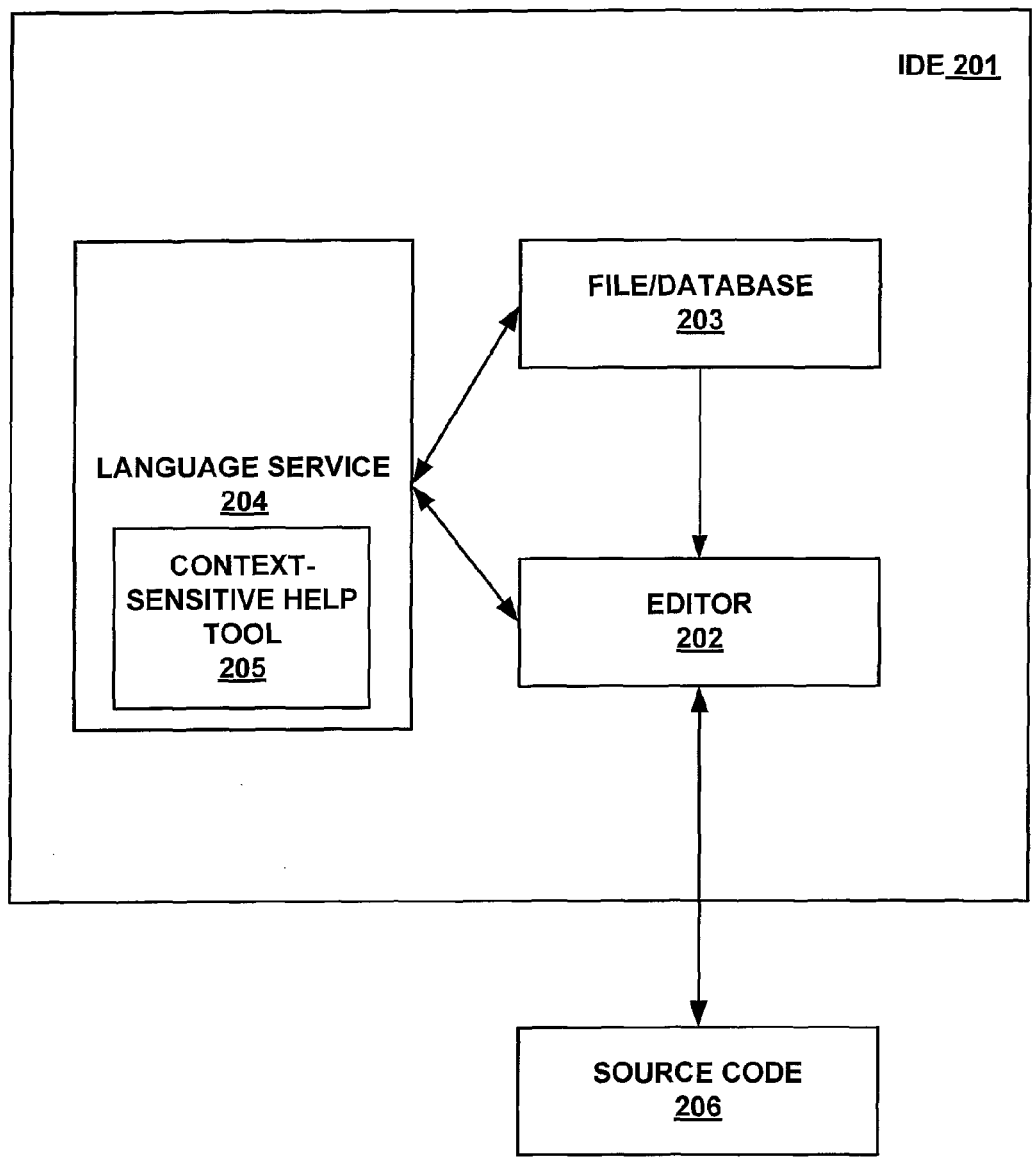
FIG. 2 is a block diagram of a system that generates a context-sensitive list of potential next tasks in accordance with one embodiment of the invention.

FIG. 2 is a block diagram illustrating an exemplary system for monitoring user input and proffering a list of potential next tasks in accordance with one embodiment of the invention. The system includes a context-sensitive potential next task determiner 205, a file/database 203 (optional), a language service 204 and an editor 202 within a design environment 201 for drafting and editing source code 206. Those of ordinary skill in the art will appreciate that the design environment 201 may also include other components, not shown in FIG. 2. Source code 206 typically is a set of instructions that a programmer or developer types or edits, and is written in a given programming language or combination of programming languages. Source code typically comprises one or more statements, each statement typically comprising one or more expressions and/or entities. The expressions and/or entities in the statement can be made up of multiple components. Source code 206 may be persisted onto a stable storage medium.

Editor 202 in one embodiment is part of an Integrated Development Environment (IDE) 201, and facilitates the development of the source code 206 of a computer program. Editor 202 may be a C++ editor, a C# editor, a Visual Basic editor, a J# editor or the like.

Language service 204 may be optimized for use with Visual C++ code, with Visual C# code, with Visual Basic code, with Visual Java # code or the like. The programming languages anticipated for inclusion in the list of available language services includes the above mentioned, COBOL and any other suitable languages associated with program development.

Language service 204 may include a dynamic parser as described in U.S. Pat. No. 6,367,068 B1 issued on Apr. 2, 2002, entitled "Dynamic Parsing". Such a parser may operate to parse the source code 206 according to the parsing rules applicable to the programming language (e.g., a C++ parser, a C# parser, a Visual Basic parser, a J# parser or the like). The parser may parse only a subset of the source code, (e.g., the current function or method being edited). The parser may include heuristics to ignore certain non-fatal errors, such as but not limited to missing statement terminators, missing closing parenthesis, missing function terminators and the like. Similarly language service 204 may include an automatic statement completion module, an automated help module and/or a statement building and information tool as described above.

Language service 204 may include a compiler, such as but not limited to, a C++ compiler, a C# compiler, a Visual Basic compiler and/or a J# compiler. Typically a compiler includes a parser and a component that builds executable code. A parser receives input in the form of sequential source program instructions, interactive online commands, markup tags, or some other defined interface and breaks them up into parts. For example a parser may break source code into nouns (objects), verbs (methods), and their attributes or options. A parser may also check to see that all necessary input has been provided.

Language service 204 preferably includes context-sensitive tool 205. Alternatively, the context-sensitive tool may exist external to language service 204. The context-sensitive next-task help tool 205 parses user keystrokes for a triggering character or sequence of characters, as the keystrokes are input. Upon detection of a triggering character or sequence of characters, the tool determines potential next tasks.

For example, in the case of adding method stubs to an interface, entering the interface name as part of the class definition is the triggering event.

For example, suppose the user types:
   class CFoo:public IBar
the input of "IBar" following "class Cfoo:public" triggers the display of an icon. Upon further user input, as described below, the automatic addition of stubs for all the methods of IBar can be effected.

As another example, assume that a developer has written an interface such as the following:

```
interface IEmployee
{
    string Name { get; set; }
    int Age { get; set; }
}
```

Assume also, that the developer has written several classes that implement this interface. Each of these classes therefore have a 'Name' property and an 'Age' property, as required by the contract of the interface.

Next, say the developer realizes that the IEmployee interface also needs a 'Salary' property. Using the code editor, the developer may change the interface to look like this:

```
interface IEmployee
{
    string Name { get; set; }
    int Age { get; set; }
    decimal Salary { get; set; }
}
```

At the point when the newly added property is complete in the editor, an icon would appear, and when clicked or otherwise selected, an option to automatically add stub implementations of the 'Salary' property to all classes that implement Iemployee would be displayed.

Another exemplary triggering sequence is usage of some specific API (Application Programming Interface) such as "SQLConnect". Entering "SQLConnect" indicates that the next set of tasks to be performed is to use the SQL connection to retrieve or input data to the database. It should be understood that the particular examples are exemplary only and other suitable triggering sequences are contemplated.

In determining potential next tasks, file/database 203 may be accessed. File/database 203 may include information on entities in the source code. File/database 203 typically is a file comprising a database that, in one embodiment of the invention, is used by the parser to store information including, but not limited to, class definitions, member data types, and reference information such as source file names and line numbers where an identifier, token, or function name is defined or referenced, as described in co-pending application Attorney Docket No. MSFT-1249 filed concurrently herewith, entitled "System and Method for Browse Information Parsing Without Compilation", and is populated and maintained by the parser. File/database 203 typically also includes information not only from source code 206, but also includes information from other sources including system header files, Microsoft Foundation Class (MFC) header files and ActiveX Template Libraries (ATL), all of which are known in the art. In one embodiment of the invention, file/database 203 is referred to as a No Compile Browse (NCB) file. File/database 203 may include a compiler symbol table (for example, a C# or J# symbol table stored in a database), or a separate file (for example, a C++ file generated by a portion of the language service 204). Alternatively, a file or database in memory (not shown) may be accessed, (for example, a Visual Basic compiler symbol table stored in a database in memory). Tables, files, databases and the like, whether stored in memory on persisted to a stable storage medium are contemplated by the invention. Alternatively, file/database 203 while appearing as one database to the user, actually may be comprised of multiple stores or databases. For example, a first database (e.g., a project database) may be dynamically updated by the parser, as described above. In addition, the pre-built database may contain information that seldom changes, such as the operating system definitions and header files, and MFC/ATL class definitions and header files referred to above. Those of ordinary skill in the art will recognize that other class definitions and header files could be included in the pre-built database. One or more pre-built databases may exist.

Continuing the example described above, in which method stubs for an interface can be automatically generated, assume the following line of code was entered:
   class CFoo:public IBar
Upon entering "IBar" following "class CFoo:public", the methods of IBar are retrieved by accessing database 203. In this case database 203 includes a list of all the methods of IBar.

As another example, assume the developer is authoring a new class, and declares it to implement an interface called 'IEnumerable'. At this point in accordance with one embodiment of the invention, an icon would be displayed, which, upon selection, provides an entry offering to provide stub implementations of all the members of IEnumerable to the new class, since that is a requirement of implementing the interface. The database 203 contains the information about the interface IEnumerable, including the names and signatures of the methods it has, what interfaces it extends, etc. It should be understood that the examples recited above are exemplary only and any suitable content for and use of database 203 is contemplated by the invention.

Thus, in accordance with one embodiment of the invention, the system of FIG. 2 operates as follows. A user (e.g., a developer) drafts source code 206 with editor 202. As the developer generates the source code 206, one of the components of IDE 201 detects an event and invokes context-sensitive help module 205. Context-sensitive help module 205 then displays an icon. If the icon is selected, context-sensitive help module 205 parses the code fragment using information from file/database 203 to provide context-sensitive choices to the developer concerning potential next-tasks. Upon selection of one or more entries, the task or tasks associated with the entry or entries is performed. In one embodiment of the invention, the event invoking the context-sensitive help module 205 is the entry of certain pre-determined programming-language-defined constructs.

The icon in one embodiment of the invention is displayed in the editor near the triggering character or sequence of characters. In response to user selection of the icon by positioning a cursor over the icon or by selecting the icon in other ways known in the art, a window is generated, displaying a list. The list preferably includes one or more potential next task(s). Upon selection of an entry or a series of entries in the list by clicking on the entry (or entries) or by selecting the entry (or entries) using other ways known in the art, the task associated with the list entry is automatically performed.

Figure 3:
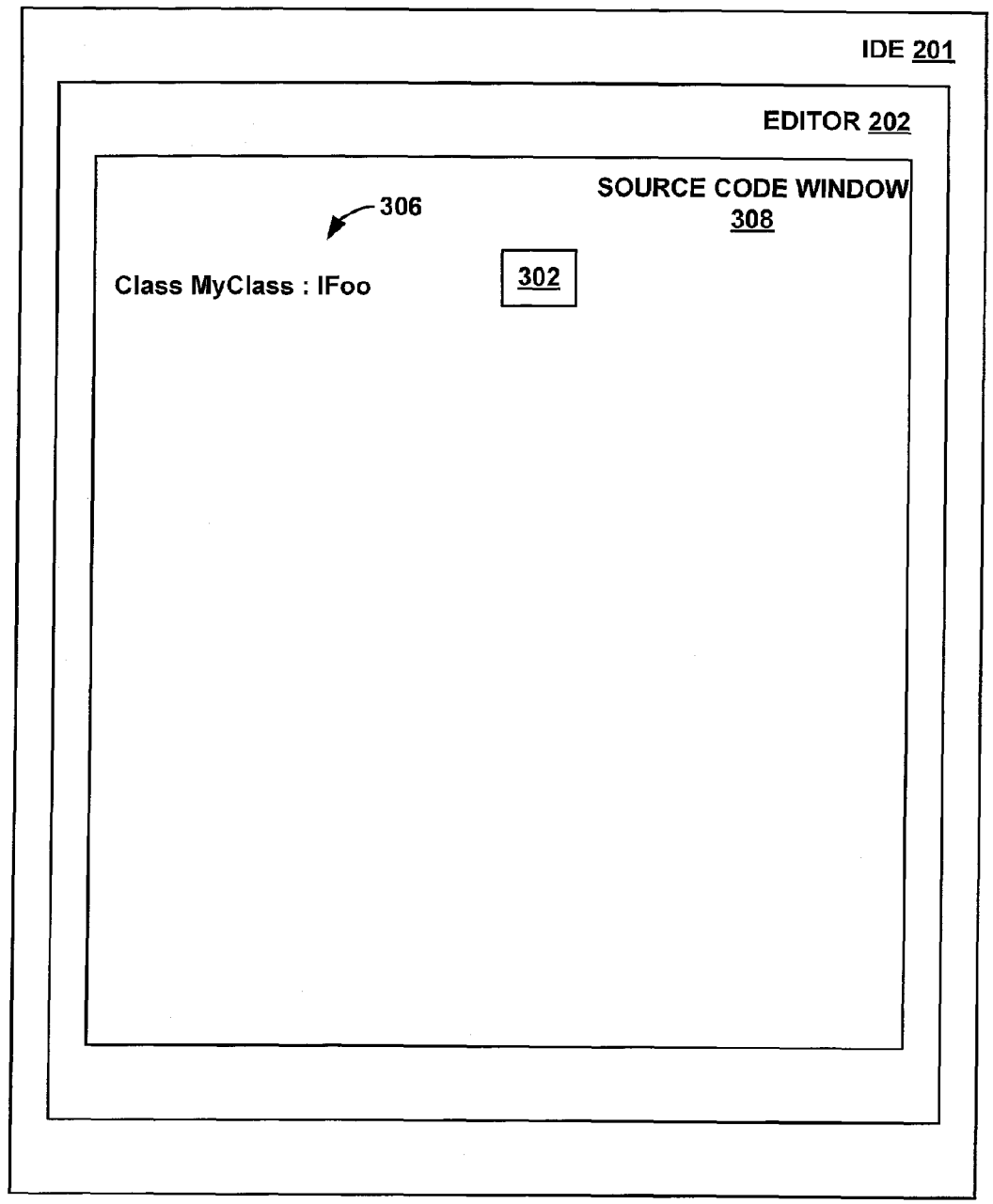
FIG. 3 is a block diagram illustrating a representative screen shot of a section of source code in an editor, showing the appearance of an icon in accordance with one aspect of the invention.
Figure 4:
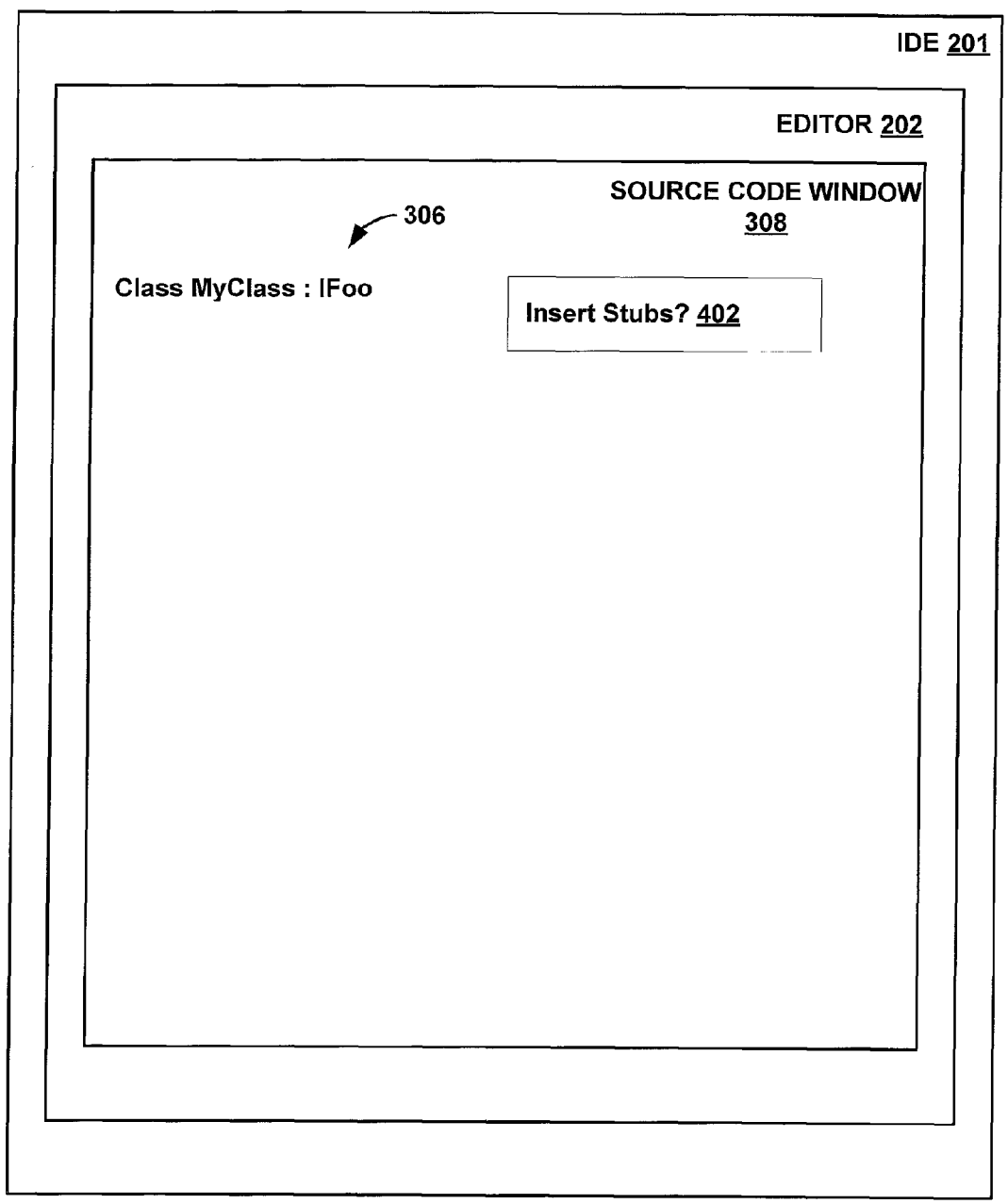
FIG. 4 is a block diagram illustrating a representative screen shot of a section of source code in an editor, showing a list of potential tasks in accordance with one aspect of the invention.

FIG. 3 is a block diagram illustrating a representative screen shot of a section of source code in an editor, showing the appearance of an icon in accordance with one aspect of the invention. FIG. 4 is a block diagram illustrating a representative screen shot of a section of source code in an editor, showing a list of potential tasks in accordance with one aspect of the invention.

Within a design environment such as an Integrated Design Environment (IDE) 201, a C++ editor 202 enables the creation or editing of C++ source code 306 as depicted in window 308. Source code 306 is displayed within window 308. Context-sensitive help tool 205 generates icon 302 when triggered by the keystrokes input by the user. Upon selection of icon 302, icon 302 is dismissed and a list 402 of potential tasks is displayed.

For example, assume that a developer is writing C++ code using the C++ language service 202. Assume a public interface class: "IFoo" exists in database 203, interface IFoo having two member methods, method1 and method2. Because IFoo is an interface, method1 and method2 are pure methods and are not implemented. If, for example, a user types "class MyClass:public IFoo {" into source code 306, the context-sensitive tool will detect that the user may intend to implement the IFoo interface so that the pure virtual methods of IFoo will need to be overridden in MyClass. Context-sensitive help tool 205 is triggered by the colon, the colon indicating to the tool 205 that the word that follows, (i.e., "IFoo") probably is a class such as an interface or base class). The tool includes heuristics for determining possible next tasks (i.e., implement the interface by overriding any pure methods of interface IFoo) and thereby determines that the user will probably want to write function bodies for method1 and method2. Upon determining the possible next task or tasks, the tool displays an icon 302 in the vicinity of the user input, indicating that a potential next task has been determined. Upon selection of the icon by hovering the cursor over the icon, or otherwise selecting the icon using methods known in the art, the user is prompted with a statement such as but not limited to: "Do you want to implement stubs for interface IFoo?". Upon selection of the entry, or otherwise indicating assent, using methods known in the art, the function body stub code would be automatically generated in the user's source code instance. For example, in this case, the following code may be generated:

```
void method 1 ( )
{
}
void method2 ( )
{
}
``` eliminating the need for the user to type in this code, and eliminating any mistakes the user might make in the process, and potentially increasing the productivity of the developer.

In the case of MFC/ATL in C++, accepting the icon's changes preferably would also involve making the appropriate changes to the COM map, a macro wrapped structure used to track all the interfaces implemented by a given class. While the example above relates to interfaces, it will be understood that the tool is intended to handle regular base classes as well as interfaces. With base classes, a subset or all of the base's virtual methods can be overridden.

Similarly, it should be understood that although the above example is simple, to aid in understanding, the generation of code is not restricted to beginning and ending braces. For example, perhaps method1 is defined with attribute "integer". In this case, the return type, in accordance with C++ programming conventions, is an integer, which is reflected in the code generated by the tool. For example, in this case, the tool may generate the following:

```
int method 1 ( )
{
    return 0;
}
```

Alternatively, the return type may be HRESULT, resulting in generation of:

```
HRESULT method1 ( )
{
    result S_OK;
}
```

Similarly, if method1 has an input parameter of int i and an output parameter of an integer pointer, (method1 ([in] int i, [out] int *p); the tool may generate code to make sure that p is not equal to null, and may initialize the pointer so that the following may be generated by the tool:

HRESULT method1 (int i, int *p);

```
{
    assert (p ≠ null);
    *p=0;
}
```

As much of the function body can be generated as can be determined from the information available. In addition, for example, address modifiers and parameters and the like can be generated.

As another example, in C#, interfaces may be implemented publicly or privately. When stubs are generated, methods can be marked private, in which case the method can only be called by casting an object to that specific interface. The context-sensitive tool provides the option of generating either.

When typing code to make a connection to a database (e.g., SQL/OleDB), the context-sensitive tool generates code to retrieve a dataset and subsequently close the database, using ATL or SQL or other suitable database-handling languages. For example, suppose a user types the following connection string into source code:

SQL Connect ("Database=MySQL, user=Shankar, PWD="hello").

The context-sensitive tool, triggered in this case by the reference to a database and user followed by the sequence of letter "PWD", denoting "password", generates an icon which, when selected, proffers the option of hiding the password in a registry, for example. Upon selection of the option, code including that code needed to create the necessary user classes, etc. is generated, the appropriate existing code is removed and replaced with the tool-generated code.

When typing code, if a user sees a squiggly, a wavy line commonly used to denote an error condition of some sort, and hovers over the squiggly, the context-sensitive tool preferably generates an icon proffering ways to correct the code. The fix may include adding a missing semicolon or closing brace, or identifying and correcting a typographical error in an undefined type. Alternatively, Knowledge Base (KB) articles (a good source of information regarding common issues or questions) or websites such as www.msdn.com may be accessed by establishing a connection to the Internet to identify an appropriate correction.

When typing in a declaration of a function or method or other element, implementation can be automatically generated by accessing files generated by a compiler or dynamic parser.

Wizards presently invoked by identifying a correct node and right-clicking on classview followed by filling in requested information are preferably eliminated by providing an option in the list to perform the task previously performed by the wizard.

Preferably, the IDE is open such that third parties can author their own language services, thereby augmenting the features of the standard text editor to conform to their language (such as colorization of their syntax elements, providing formatting and automatic indent capabilities, and the like). Language services are also employed in the environment to provide information to the various browsers and help systems, and also to provide useful information to the debugger if appropriate. In the context of this invention, the language service is given the opportunity to make use of the context-sensitive help functionality in accordance with one embodiment of the invention so as to present the "next-task" options while editing.

Figure 5:
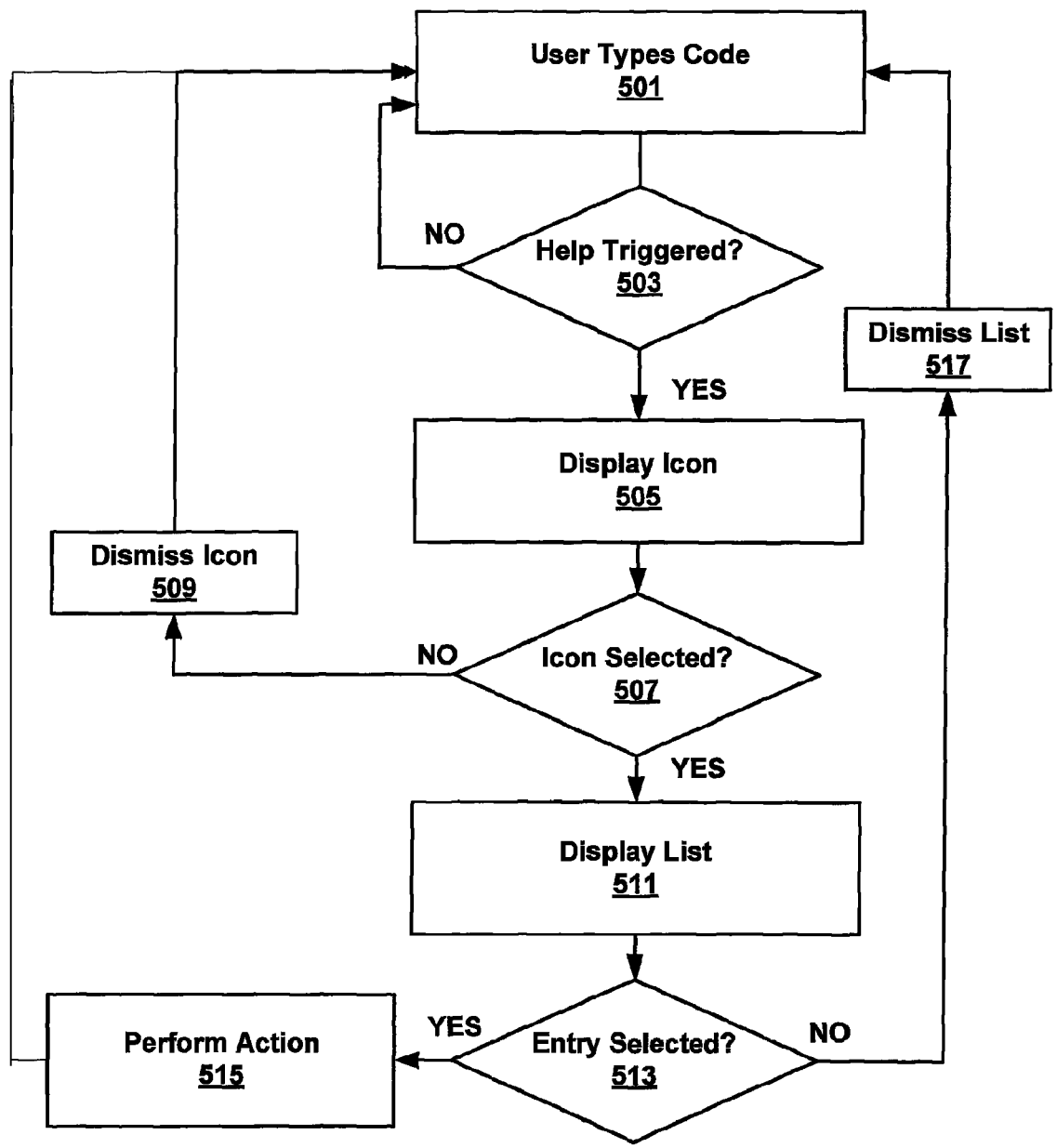
FIG. 5 is a flow diagram of a method for generating a context-sensitive list of potential next tasks in accordance with one embodiment of the invention.

FIG. 5 is a flow diagram of a method of providing context-sensitive help in accordance with one embodiment of the invention. At step 501, as source code is entered or edited, each keystroke or sequence of keystrokes is parsed to determine if the keystroke or sequence of keystrokes is a context-sensitive help trigger.

At step 503, if it is determined that the keystroke or sequence of keystrokes is not a context-sensitive help trigger, processing returns to step 501. At step 503, if it is determined that the keystroke or sequence of keystrokes is a context-sensitive help trigger, a context-sensitive help icon is generated and displayed close to the triggering keystroke(s) at step 505. At step 507, if the icon is not selected within a designated time period, the icon is dismissed at step 509 and processing returns to step 501. At step 507, if the icon is selected, a list of entries is generated and displayed at step 511. The list of entries includes possible next actions that a user might take. If one or more of the entries is selected at step 513, the action associated with the entry or entries is performed at step 515 and a section of code within a source code file may be added or a section of code originally included within the source code file may be removed and replaced with a section of code generated by the context-sensitive help engine or a section of code originally included within the source code file may be modified.

For example, suppose a user is modifying the declaration/definition of a type or method, an icon may be displayed. Upon selection of the icon, an entry may be displayed suggesting to modify all the places where the type/method is being referenced. Upon selection of the action, all the places where the type/method are referenced are modified. It should be understood that the example cited is merely exemplary and any suitable actions and entries are contemplated by the invention.

If an entry is not selected at step 513, the list is dismissed at step 517, after a specified period of time or upon positioning the cursor elsewhere, and processing returns to step 501.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of providing context-sensitive help using a programming tool that predicts potential next-tasks, the method comprising:
   monitoring user actions during source code input;
   detecting a triggering event in the monitored user actions;
   in response to detecting the triggering event, determining an action associated with the triggering event;
   in response to determining the action associated with the triggering event offering to execute the action; and
   in response to the user accepting the offer, performing the associated action, wherein an external data source is accessed and wherein sections of code comprising more than a single word are automatically entered into the source code by the programming tool based on information stored in the external data source,
   wherein the triggering event comprises entering code that when executed makes a connection to an external database and wherein the associated action comprises generating code to retrieve a dataset specified in the entered code and to close the external database and entering the generated code into the source code, wherein the triggering event further comprises entering code in the source code that specifies a password for accessing the external database, and wherein the associated action comprises hiding the password.

2. A computer-readable storage medium for providing context-sensitive help using a programming tool that predicts potential next-tasks, the computer-readable storage medium having stored thereon computer-executable instructions comprising:
   monitoring user actions during source code input;
   detecting a triggering event in the monitored user actions;
   in response to detecting the triggering event, determining an action associated with the triggering event;
   in response to determining the action associated with the triggering event offering to execute the action; and
   in response to the user accepting the offer, performing the associated action, wherein an external data source is accessed and wherein sections of code comprising more than a single word are automatically entered into the source code by the programming tool based on information stored in the external data source,
   wherein the triggering event comprises entering code that when executed makes a connection to an external database and wherein the associated action comprises generating code to retrieve a dataset specified in the entered code and to close the external database and entering the generated code into the source code, wherein the triggering event further comprises entering code in the source code that specifies a password for accessing the external database, and wherein the associated action comprises hiding the password.

3. A system for providing context-sensitive help using a programming tool that predicts potential next-tasks comprising:
- a processor;
- memory having stored therein computer-executable instructions comprising:
  - monitoring user actions during source code input;
  - detecting a triggering event in the monitored user actions;
  - in response to detecting the triggering event, determining an action associated with the triggering event;
  - in response to determining the action associated with the triggering event offering to execute the action; and
  - in response to the user accepting the offer, performing the associated action, wherein an external data source is accessed and wherein sections of code comprising more than a single word are automatically entered into the source code by the programming tool based on information stored in the external data source,
- wherein the triggering event comprises entering code that when executed makes a connection to an external database and wherein the associated action comprises generating code to retrieve a dataset specified in the entered code and to close the external database and entering the generated code into the source code, wherein the triggering event further comprises entering code in the source code that specifies a password for accessing the external database, and wherein the associated action comprises hiding the password.

* * * * *